United States Patent [19]
Mattera

[11] Patent Number: 5,960,324
[45] Date of Patent: Sep. 28, 1999

[54] METHOD FOR UNOBTRUSIVE INTERCEPTION OF SATELLITE COMMUNICATION

[75] Inventor: Michael Mark Mattera, Lake Zurich, Ill.

[73] Assignee: Motorola, Inc., Schaumburg, Ill.

[21] Appl. No.: 09/109,240

[22] Filed: Jun. 30, 1998

[51] Int. Cl.⁶ .............................. H04B 7/185; H04B 1/38; H04Q 7/20
[52] U.S. Cl. ...................... 455/12.1; 455/13.1; 455/428; 455/427; 455/560; 379/35
[58] Field of Search ................................... 455/12.1, 13.1, 455/427–430, 445, 560, 422, FOR 12.1, FOR 13.1, FOR 100, FOR 106; 379/7, 35, 34, 1

[56] References Cited

U.S. PATENT DOCUMENTS

| | | | |
|---|---|---|---|
| 5,509,004 | 4/1996 | Bishop, Jr. et al. | 455/12.1 |
| 5,526,397 | 6/1996 | Lohman | 455/560 |
| 5,710,971 | 1/1998 | Armbruster et al. | 455/12.1 |
| 5,826,171 | 10/1998 | Franke | 379/35 |
| 5,892,811 | 4/1999 | Armbruster et al. | 455/12.1 |

*Primary Examiner*—Dwayne D. Bost
*Assistant Examiner*—Tracy M. Legree
*Attorney, Agent, or Firm*—Sayed Hossain Beladi

[57] ABSTRACT

In a satellite communication system, a method of unobtrusively intercepting a communication call includes establishing a first connection to originate from a first satellite subscriber (SU) and terminate at a first node at a first transcoder, establishing a second connection to originate from a second node at a second transcoder and terminate at a second SU, switching the first connection to originate from the first SU and terminate at a third node at the second transcoder, passing a first information carried by the first connection at the third node to the second connection at the second node. The first information without substantial delay or processing is transmitted by the second connection to be received by the second SU. The first information may be decoded in a decoder portion of the second transcoder to produce a first decoded information. The first decoded information, accordingly, may unobtrusively be monitored.

12 Claims, 3 Drawing Sheets

METHOD FOR UNOBTRUSIVE INTERCEPTION OF SATELLITE COMMUNICATION

FIELD OF THE INVENTION

The present invention relates to communication systems, and more particularly to satellite communication systems.

BACKGROUND OF THE INVENTION

Interception of a call being communicated between two telephone subscribers may become necessary for many different reasons. One reason for interception of a call is for the enforcement of the law by the agencies authorized to intercept private communication calls. For the obvious reasons, such interception should be made unobtrusively to maintain its secrecy. To maintain secrecy, the authorized law enforcement agency may establish a monitoring station at a convenient location to unobtrusively intercept call connections originated or terminated at a subscriber. In case of terrestrial communication systems, such as land based telephone systems or cellular phone communication systems, the monitoring station may be setup at a public switched telephone network (PSTN) near the location of the subscriber, or in case of cellular communication system, the monitoring station may be setup at a mobile switching controller (MSC). Therefore, interception of such a call connection can conveniently be accomplished.

In case of satellite communication systems, however, a call connection originated from a subscriber may not pass through PSTN or MSC because a satellite subscriber (SU) is capable of directly carrying a call connection with a satellite or another SU through a network of satellites without going through a PSTN or MSC. Similarly, a satellite subscriber is capable of receiving a call connection directly from a satellite while all ground connections are cut-away. As a result, two SU's may have an ongoing communication call directly by making a series of call connections through a network of satellites without maintaining any ground connection. Since there may not be any ground connections, interception of a call connection originated or terminated at a SU in a satellite communication system has become difficult and in some instances impossible.

Therefore, there is a need for a method for unobtrusively intercepting communication calls in a satellite communication system.

DETAILED DESCRIPTION OF THE PREFERRED EMBODIMENT(S)

Figure 1:
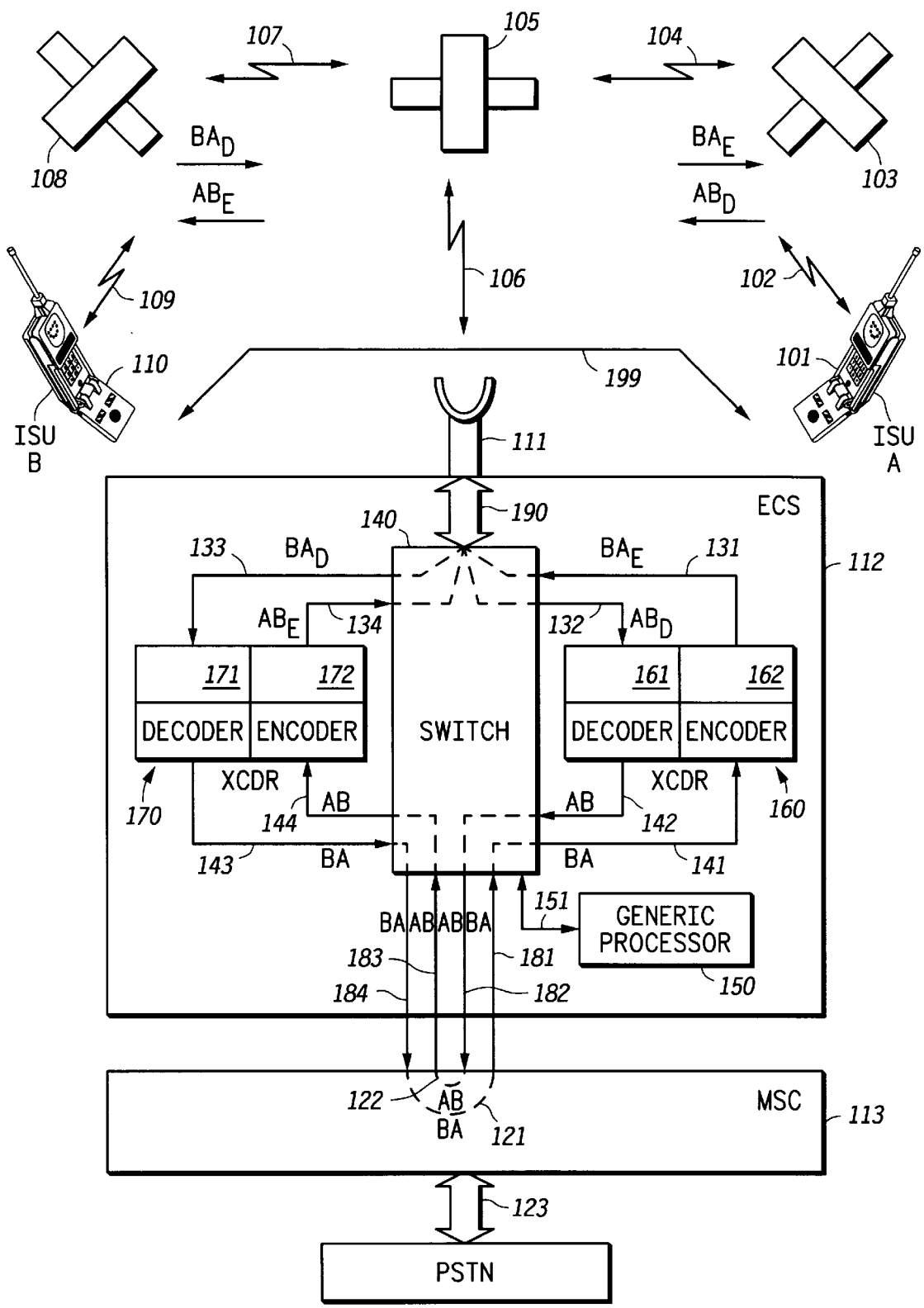
FIG. 1 depicts the process of establishing a call connection in Iridium™ system.

In a satellite communication system, a method of unobtrusively intercepting a communication call includes establishing a first connection to originate from a first satellite subscriber (SU) and terminate at a first node at a first transcoder, establishing a second connection to originate from a second node at a second transcoder and terminate at a second SU, switching the first connection to originate from the first SU and terminate at a third node at the second transcoder, and passing a first information carried by the first connection at the third node to the second connection at the second node. The first information without substantial delay or processing is transmitted by the second connection to be received by the second SU. Since the first information originated from the first SU and carried by the first connection at the third node is passed at the second node to the second connection which is terminated at the second SU, the first information is received at the second SU without any processing which makes the appearance that the second connection is directly originated from the first SU without being passed through any other connecting nodes. The first information may be decoded in a decoder portion of the second transcoder to produce a first decoded information. The first decoded information may be monitored. Such a monitoring according to one aspect of the invention is unobtrusive.

Processing of the first information in addition to what is necessary to carry on a direct satellite subscriber call adds additional delay and changes the quality of the first information when decoded by a receiving portion of the second SU. Substantial additional delays and changes in quality of information are easily detectable. The first and second SU's would not know or can not detect that the call connection between the first and the second SU's is being monitored, according to various aspects of the invention, because the information received by the second SU has not substantially been delayed or additionally processed, and has all the indications that it has been received directly from the first SU without going through any other connecting nodes. Moreover, no additional signals other than what is necessary to set up the call has been generated. When additional signals are not generated, the monitoring becomes unobtrusive and undetectable. Therefore, according to the invention, when monitoring is performed without adding delay or processing the first information or generating additional signals, the monitoring is unobtrusive.

There are a number of commercial satellite communication systems. Most or all of them have many common system characteristics. For example, each satellite system has a number of gateways located at various parts of the world. A gateway that is local to an SU is used for connecting or establishing a call connection between a SU and a land based telephone line, or a call connection between two SU's. When the call is directly between two SU's, the local gateway connections that were made to setup the connection is cut-away from a series of initial connections that were needed to setup the call. Such a series of connections may include at least a connection through a network of satellites. Once the local gateway connection is cut-away, the two SU's communicate directly through the network of satellites, or the network of satellites and a visiting gateway other than the local gateway that has setup the call.

To briefly describe operation and components of one such a satellite communication system, the Iridium™ satellite communication system is described. The Iridium™ system is a satellite based wireless communication network designed to permit any types of wireless communication between two subscribers. The communication between two subscribers may include transmission of voice or data. The Iridium™ system provides a global communication coverage through a network of satellites and a number of ground gateways. A satellite subscriber through a handheld phone or a standalone phone booth may originate or be a terminating point of a call connection with any other satellite subscriber or land-based telephone subscriber. The Iridium™ system satellite network includes a constellation of sixty six orbiting satellites. Each satellite projects a tightly-focused beam over the ground below as it travels through the sky. The Iridium™ phones are the primary means by which a subscriber can communicate directly through the Iridium™ satellite network. The Iridium™ phones may be a handheld unit, a standalone solar powered telephone booth, or any other unit incorporating the Iridium™ phone. A ground control system serves as the central management component of the Iridium™ satellite network. Such a ground control performs, among many other functions, the regulation of the positioning of the satellites within the constellation during the orbit. In addition, the Iridium™ system includes a series of gateways located at various parts of the world to interconnect the Iridium™ satellite network with PSTN or any other terrestrial communication systems. The Iridium™ system employs a combination of Frequency Division Multiple Access and Time Division Multiple Access (FDMA/TDMA) signal multiplexing to make the most efficient use of its frequency spectrum. The Iridium™ system spectrum includes the L-Band: 1616–1626.5 MHz, and Ka-Band: 19.4–19.6, and 29.1–29.3 GHz. The L-Band is used exclusively for communication between the Iridium™ system subscriber phone or equipment and Iridium™ satellite network. The first portion of the Ka-Band is used for down links, and the second portion is used for uplinks between the Iridium™ satellite network, the gateways and ground control. The Ka-Band also is used for inter-satellite communication links.

The Iridium™ system satellite network ensures that at least one satellite is available to receive a call from a SU at any time at any location on earth. An SU normally makes a direct connection with an available satellite to initiate a call connection. The call connection is then relayed from one satellite to another until it reaches its destination. The relay is either through a gateway or directly through the satellite network. If the call connection is terminated at a land-based telephone, the call connection must pass through a gateway. If the land-based subscriber is connected to a PSTN at the SU's home gateway, the connection passes through the home gateway; otherwise, a visiting gateway is used. If the call connection is terminated at an Iridium™ subscriber phone, the call connection may need only go through the Iridium™ satellite network. The Iridium™ satellite network keeps track of the subscribers location anywhere on earth. Every SU has a home gateway, and when a call is originated from a SU, the system retrieves information about the SU from its home gateway at least for the initial call connection.

A signal bearing the subscriber's unique identification number is relayed by the Iridium™ phone back to a home gateway. The home gateway shares the location information with the rest of the Iridium™ system components. The home gateway keeps the necessary information such as authentication and location of every one of its assigned subscribers. When an Iridium™ subscriber initiates a call connection, the satellite network relays the information to the home gateway of the subscriber for authentication. Once the authentication is approved by the home gateway, a list of gateways are communicated back. The gateways in the list are those visiting gateways that the SU may use to complete its call connection. One of the visiting gateways is a local gateway close to the location of the SU. If the destination of the call connection is at a land-based telephone connected to PSTN at the home gateway, a new call connection to the home gateway is setup for completing the call connection to the land-based telephone. If the destination of the call connection is at a land-based telephone connected to a public switching network at a visiting gateway, a new call connection is made to the visiting gateway. Also in a case when the destination of the call connection is another Iridium™ subscriber, a new call connection at a visiting gateway is setup. The call connection is made through a series of link relays through the Iridium™ satellite network to the location of the Iridium™ subscriber intended to receive the call, or to the visiting gateway where PSTN has a connection to the destination land-based telephone.

The authorized agency can conveniently establish a monitoring station at a gateway to monitor a call connection through the gateway. In case when the call connection is being originated from a first Iridium™ subscriber and terminated at a second Iridium™ subscriber phone or at a land-based telephone connected essentially to another gateway through the connecting PSTN, the authorized agency can not conveniently establish a monitoring station at every ground gateway station to monitor the calls originated or terminated at the first Iridium™ subscriber phone. Therefore, a local gateway station is the only place where monitoring can conveniently take place. The local gateway station is the gateway station close to the location of the SU originating or receiving the call.

By referring to FIG. 1, the process of establishing a call connection in Iridium™ system is described. An Iridium™ subscriber phone (ISU) 101 makes an initial connection through a link 102 with a satellite 103 orbiting in the sky above ISU 101 at the time. If satellite 103 is also above the local gateway of ISU 101, satellite 103 would directly make a link with the local gateway. If the local gateway is located under the coverage of a different satellite in the network of satellites, link 102 is relayed through a link 104 to the other satellite, shown as a satellite 105, above the local gateway. Since the satellites are continuously orbiting, a different satellite appears above the local gateway according to the Iridium™ system satellite orbiting plan. Satellite 105 relays the information received from link 104 through a link 106 to a receiving station 111 at a local gateway 199. Station 111 is in communication with an earth terminal communication subsystem controller (ECS) 112 which is in communication with a mobile switching center (MSC) 113 to setup a call connection. MSC 113 is in communication with a local PSTN through a connection 123 for setting up the call to a land-based telephone serviced by the local PSTN. If the call connection is for an ISU 110 or a land-based telephone serviced by an MSC other than MSC 113, the call connection at MSC 113 and ECS 112 is eventually cut-away. In case of cut-away, link 104 is relayed through a link 107 to a satellite 108 located above ISU 110. Satellite 108 relays link 107 through a link 109 to ISU 110. The link 102 may be relayed through several orbiting satellites until it reaches a satellite over the location of ISU 110, although one relay between satellites 105 and 108, and one relay between satellites 103 and 105 are shown in FIG. 1.

ECS 112 receives the signals associated with link 106 after it is down converted to a signal 190 at a suitable frequency band and format for use by ECS 112. ECS 112 has a central switching center 140, hereinafter referred to as switch 140, that is controlled by a generic processor 150 through a connection 151. Generic processor 150 allocates a transcoder, such as transcoder 160 or 170, for processing a call connection requested by the information received in signal 190. Such information are formatted in a recognizable messaging format. Each transcoder has an encoder and a decoder portion, and normally are working in pairs for an ISU to ISU call connection. Each transcoder is allocated to an ISU and its associated connections. Each transcoder has a unique address. When one transcoder is allocated an ISU, any signal terminated or originated from that ISU is processed in that transcoder. For the signals terminated at the ISU, the encoder portion encodes the signal before being transmitted. Similarly, when a signal is received from the ISU, the signal is decoded and passed on to other sections for processing the call connection. In the example shown in FIG. 1, transcoder 160 is allocated to ISU 101, and transcoder 170 to ISU 110.

As shown in FIG. 1, switch 140 routes the call connection originated from ISU 101 to a connection 132 at a node 161 at transcoder 160. Information carried by connection 132 at node 161 is decoded in a decoder portion of transcoder 160, and the decoded information is passed on to switch 140 through a connection 142. Information received from connection 142 is passed by switch 140 to a connection 182.

MSC 113 receives the information carried by connection 182. MSC 113 or ECS 112 also perform call connection authentication and other necessary function to allow or deny a call connection. If a call connection is allowed, MSC 113 decides whether the call connection is for a land-based telephone line or another ISU or a land-based telephone line connected to a another gateway. If the call connection is for a local land-based telephone line, the call connection is setup accordingly. If otherwise, connection 182 is routed back at 122 to a connection 183. The routed information at connection 183 is passed to a connection 144, after passing through switch 140, to be encoded by an encoder portion of transcoder 170. The encoded information is passed on by a connection 134 to be transmitted through link 106 to satellite 105 and subsequently through one or more relay, such as relay 107, to satellite 108. Satellite 108 then communicates the received information through a link 109 to ISU 110. The routing of the information through such series of connection is accomplished by keeping track of a data field in the messaging format containing an address field indicating the pathend address of the series of the connections.

When ISU 110 is originating a call connection to be terminated at ISU 101, possibly in response to making a duplex connection with ISU 101, the associated call connection information in signal 190 is routed through a connection 133 to a node 171 at transcoder 170. The associated call connection information is received by a series of relays and connections made by links 109, 107 and 106, and satellites 108 and 105 as shown in FIG. 1. Other satellites and links may additionally be involved, but are not shown. The information carried by connection 133 is decoded in a decoder portion of transcoder 170 routed through switch 140 by way of connection 143 and passed on to MSC 113 through connection 184. Since such call connection is between two ISU's, the information is routed back at 121 to a connection 181. The information carried by connection 181 is passed on, through switch 140, to encoder portion of transcoder 160 to be encoded by way of connection 141. The encoded information is passed on to signal 190 through a connection 131. The signal 190 is communicated through link 106 to satellite 105. Through a series of relays performed by the satellite networks, link 106 is terminated at ISU 101. As such, a duplex connection between ISU's 101 and 110 is made.

Once the MSC 113 detects that the call connection is between two ISU's, and a call setup has been completed, it directs various components of gateway 199 to cut-away from the series of connections connecting ISU 101 to ISU 110. Once the cut-away is completed, link 106 is no longer necessary, and the call connection between ISU 101 and ISU 110 is accomplished through a series of connections within a network of satellites. For example, the network of satellites may include satellites 103, 105 and 108, as shown in FIG. 1.

Figure 2:
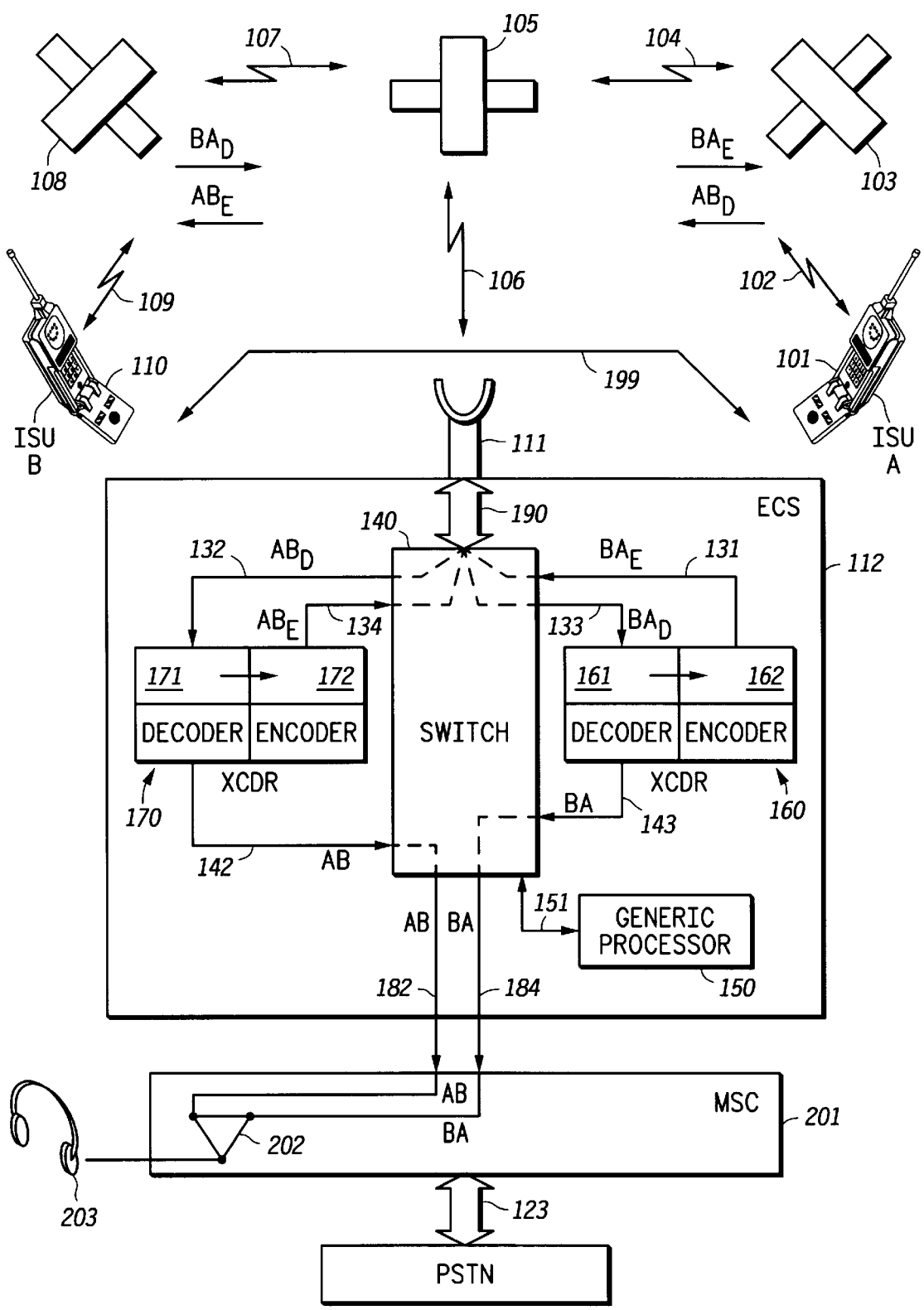
FIG. 2 depicts a call connection while being monitored according to an embodiment of the invention.

Referring to FIG. 2, if a call connection needs to be monitored, the cut-away is not completely performed. The connections in ECS 112 are re-arranged or cut-away to make the call connection between ISU's 101 and 110 while the call connection is unobtrusively being monitored. Since transcoder 160 is allocated to ISU 101, call connection 131 which is directed to ISU 101 is remained as its was before, similarly, transcoder 170 is allocated to ISU 110, call connection 134 which is directed to ISU 110 is remained as before. The call connections 132 and 133 are switched to terminate at each other transcoders. Call connection 133 after switch is terminated at transcoder 170, and call connection 132 at transcoder 160. The information carried by call connections 132 and 133 are decoded in decoded portions of transcoders 160 and 170. The decoded information can be monitored by a monitoring station 203. The decoded information at connections 142 and 143 are passed on to connections 182 and 184 respectively. MSC 201 has a multiple inputs switch 202 to route the decoded information to a monitoring station 203. At the same time, the information received by call connection 132 at node 171 is passed on to node 172 for immediate transmission to ISU 110 without any processing or substantial delay by call connection 134. Similarly, the information received by connection 133 at node 161 is passed on to node 162 for immediate transmission to ISU 101 without any processing or substantial delay by call connection 131.

Figure 3:
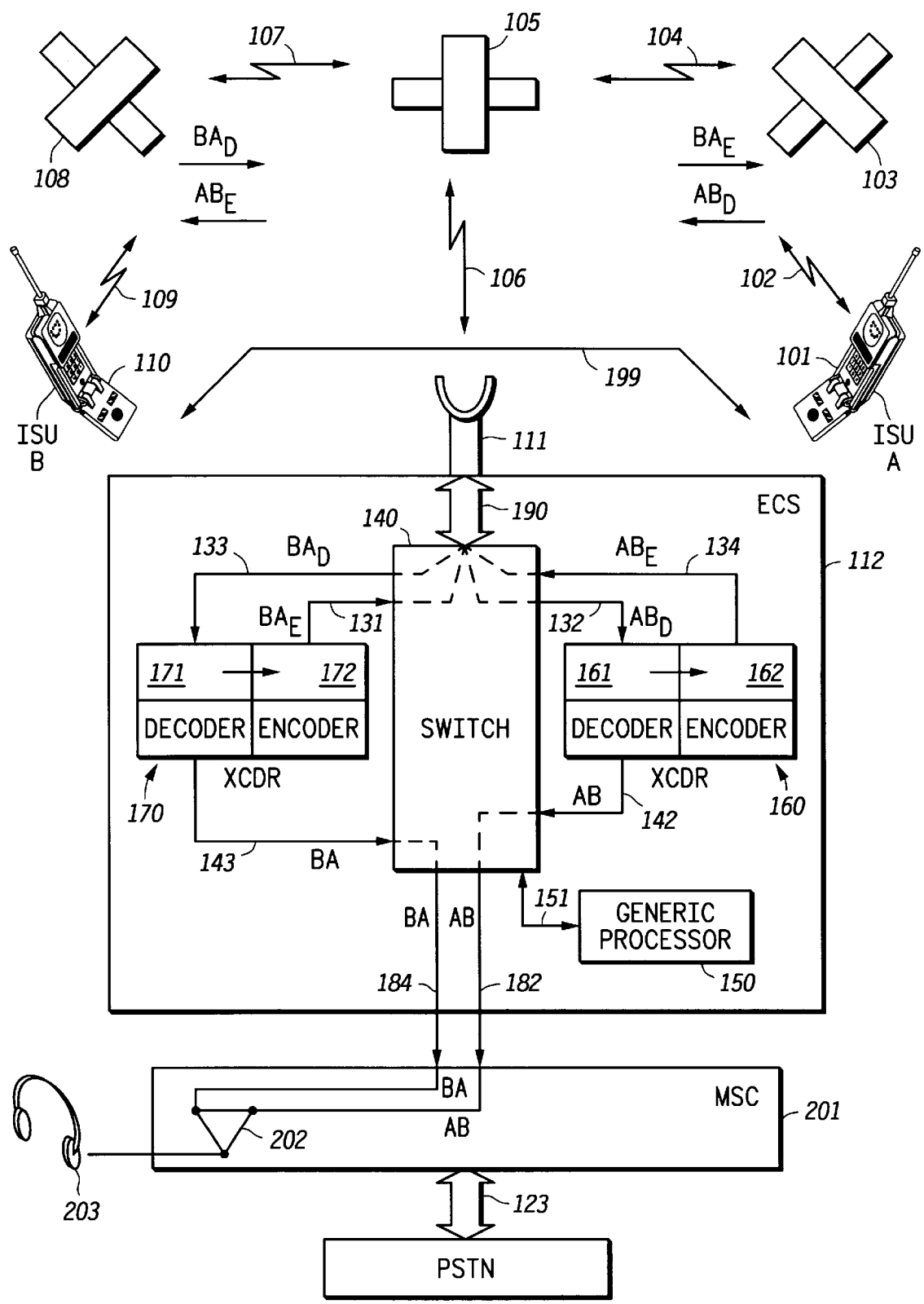
FIG. 3 depicts a call connection while being monitored according to an alternative embodiment of the invention.

Referring to FIG. 3, if a call connection needs to be monitored, according to an alternative embodiment of the invention, the cut-away is not completely performed. The connections in ECS 112 are re-arranged or cut-away to make the call connection between ISU's 101 and 110 while the call connection is unobtrusively being monitored. Since transcoder 160 is allocated to ISU 101, call connection 132 which carries information sent by ISU 101 is remained as its was before, similarly, transcoder 170 is allocated to ISU 110, call connection 133 which carries information sent by ISU 110 is remained as before. The call connections 131 and 134 are switched to originate at each other transcoders. Call connection 131 after switch is originated at transcoder 170, and call connection 134 at transcoder 160. The information carried by call connections 132 and 133 are decoded in decoded portions of transcoders 160 and 170. The decoded information can be monitored by monitoring station 203. The decoded information at connections 142 and 143 are passed on to connections 182 and 184 respectively. MSC 201 has a multiple inputs switch 202 to route the decoded information to monitoring station 203. At the same time, the information received by call connection 132 at node 161 is passed on to node 162 for immediate transmission to ISU 110 without any processing or substantial delay by call connection 134. Similarly, the information received by connection 133 at node 171 is passed on to node 172 for immediate transmission to ISU 101 without any processing by call connection 131.

According to the invention, some of the initial call connections at a local gateway are not cut-away, and some of the initial call connections are rearranged such that the ISU's do not detect the call connections are still connected to the local gateway. Since there are some call connections at the local gateway, according to the invention, the calls can be monitored unobtrusively.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. In a satellite communication system, a method comprising the steps of:

establishing a first connection, through a satellite network, to originate from a first satellite subscriber (SU) and terminate at a first node at a first transcoder;

establishing a second connection to originate from a second node at a second transcoder, through said satellite network, and terminate at a second SU;

switching said first connection to originate from said first SU and terminate at a third node at said second transcoder;

passing a first information carried by said first connection at said third node to said second connection at said second node; and transmitting said first information without substantial delay and processing by said second connection to be received by said second SU.

2. The method as recited in claim 1 further comprising the steps of:

decoding said first information in a decoder portion of said second transcoder to produce a first decoded information; and monitoring said first decoded information.

3. The method as recited in claim 1 further comprising the steps of:

establishing a third connection, through said satellite network, to originate from said second SU and terminate at said third node;

establishing a fourth connection to originate from a fourth node at said first transcoder, through said satellite network, and terminate at said first SU;

switching said third connection to originate from said second SU and terminate at said first node;

passing a second information carried by said third connection at said first node to said fourth connection at said fourth node; and transmitting said second information by said fourth connection to be received by said first SU without substantial delay and processing.

4. The method as recited in claim 3, further comprising the steps of:

decoding said second information in a decoder portion of said first transcoder to produce a second decoded information; and monitoring said second decoded information.

5. The method as recited in claim 3 wherein said second information includes a second pathend connection address, said switching third connection includes changing said second pathend connection address to route said third connection to originate from said second SU and terminate at said first node.

6. The method as recited in claim 1 wherein said first information includes a first pathend connection address, said switching said first connection includes changing said first pathend connection address to route said first connection to originate from said first SU and terminate at said third node.

7. In a satellite communication system, a method comprising the steps of:

establishing a first connection to originate from a first node at a first transcoder, through a satellite network, and terminate at a first satellite subscriber (SU);

establishing a second connection to originate from a second SU, through said satellite network, and terminate at a second node at a second transcoder;

switching said first connection to originate from a third node at said second transcoder, through said satellite network, to said first SU;

passing a first information carried by said second connection at said second node to said first connection at said third node; and transmitting said first information by said first connection to said first SU without substantial delay and processing.

8. The method as recited in claim 7 further comprising the steps of:

decoding said first information in a decoder portion of said second transcoder to produce a first decoded information; and monitoring said decoded information.

9. The method as recited in claim 7 further comprising the steps of:

establishing a third connection to originate from said third node and terminate at said second SU;

establishing a forth connection to originate from said first SU and terminate at a forth node at said first transcoder;

switching said third connection to originate from said first node and terminate at said second SU;

passing a second information carried by said forth connection at said forth node to said third connection at said first node; and transmitting said second information by said third connection to said second SU without substantial delay and processing.

10. The method as recited in claim 9 further comprising the steps of:

decoding said second information at a decoder portion of said second decoder and encoder to produce a second decoded information; and monitoring said decoded information.

11. The method as recited in claim 9 wherein said second information includes a second pathend connection, said switching said first connection includes changing said second pathend connection to route said third connection to originate from said first node and terminate at said second SU.

12. The method as recited in claim 7 wherein said first information includes a first pathend connection address, said switching said first connection includes changing said first pathend connection to route said first connection to originate from said third node and terminate at said first SU.

* * * * *